(12) United States Patent
Quann

(10) Patent No.: US 6,945,014 B1
(45) Date of Patent: Sep. 20, 2005

(54) AIR-TIGHT COFFEE STORAGE CONTAINER

(76) Inventor: Mark Quann, 14821 Sherman Way #21, Van Nuys, CA (US) 91405

( * ) Notice: Subject to any disclaimer, the term of this patent is extended or adjusted under 35 U.S.C. 154(b) by 150 days.

(21) Appl. No.: 10/434,997

(22) Filed: May 9, 2003

(51) Int. Cl.[7] .............................................. B65B 31/00
(52) U.S. Cl. ...................................... 53/432; 53/510
(58) Field of Search ........................ 53/432, 436, 510; 99/472; 141/8, 65; 206/524.8; 215/231, 228, 215/311, 267; 220/231, 578, 580, 212, 367.1, 220/372, 521, 222, 360

(56) References Cited

U.S. PATENT DOCUMENTS

| | | | | |
|---|---|---|---|---|
| 297,854 A | * | 4/1884 | Sample | 220/231 |
| 1,978,025 A | * | 10/1934 | McCown | 220/580 |
| 2,096,358 A | * | 10/1937 | Gautier | 220/580 |
| 2,172,457 A | * | 9/1939 | Hyman | 220/578 |
| 2,190,203 A | * | 2/1940 | Barnard | 220/578 |
| 2,726,012 A | * | 12/1955 | Jensen | 220/580 |
| 3,924,774 A | * | 12/1975 | Donnelly | 220/580 |
| 4,218,967 A | * | 8/1980 | Batchelor | 99/472 |
| 4,744,204 A | * | 5/1988 | Schlegel | 53/526 |
| 5,469,979 A | * | 11/1995 | Chiou | 141/65 |

* cited by examiner

*Primary Examiner*—Stephen F. Gerrity
(74) *Attorney, Agent, or Firm*—Goldstein LawOffices P.C.

(57) ABSTRACT

A coffee storage container, for storing a quantity of coffee within a jar having a bottom and a side wall, and using a piston having a top and bottom, and a one-way valve. The quantity of coffee is placed in the jar bottom. The piston extends within the jar and defines a storage volume beneath the piston bottom. A stem is selectively attached to the piston top to push the piston downward to allow air to escape through the one-way valve so that the storage volume becomes substantially the coffee volume and little or no air remains within the storage volume. The stem may be removed from the piston for storage.

4 Claims, 4 Drawing Sheets

AIR-TIGHT COFFEE STORAGE CONTAINER

BACKGROUND OF THE INVENTION

The invention relates to a coffee storage container. More particularly, the invention relates to a coffee storage container which adjusts to the volume of coffee contained within the container to substantially eliminate air therein.

It is well known that ground coffee deteriorates upon exposure to air. For this reason, ground coffee is often sold in 'vacuum sealed' packaging. Such is effective for preserving freshness as the coffee makes its way through distribution channels. Once the packaging is opened by the end user, however, the seal is broken, and the coffee is exposed to air.

Depending on the quantity purchased, and the coffee drinking habits of the user, a considerable amount of time can elapse between the initial exposure to air and the actual use of the ground coffee. During this time, the coffee will deteriorate in taste, quality, and in summary 'lose freshness'.

Various devices have been proposed which seek to reduce the exposure of coffee to air. In particular, the age-old 'vacuum jar', at least prevents circulation of air to the coffee. The coffee remains, however, exposed to a volume of air that is trapped within the jar along with the coffee. This air can color the flavor of the coffee, absorb moisture from the coffee, or otherwise detract from its freshness. In addition, each time the jar is opened, new air is introduced to the jar and trapped therein. Such air would have an additional effect on the freshness of the coffee. Further, as the coffee is consumed, its volume within the jar will decrease. As the volume of coffee decreases, the volume of air will steadily increase. Accordingly, by the time the very last of the coffee is to be used, it will not only be quite old, but will have been trapped in a jar that is mostly air.

While these units may be suitable for the particular purpose employed, or for general use, they would not be as suitable for the purposes of the present invention as disclosed hereafter.

SUMMARY OF THE INVENTION

It is an object of the invention to produce a coffee storage container for storing coffee and preventing its exposure to air. Accordingly the storage container has a lid which prevents the circulation of air into the container.

It is another object of the invention to produce a coffee storage container which substantially eliminates air in contact with the coffee therein. Accordingly, the container has a piston which is pressed downward against the coffee so that the coffee is contained within a storage space substantially the same as its own volume—leaving little room for air.

It is yet another object of the invention to provide a coffee storage container which allows air to escape from the storage space while creating a tight seal to prevent air from infiltrating the storage space. Accordingly, piston has a sealing ring and a one-way valve for allowing air to escape as it is pressed downward to minimize the size of the storage space.

It is a further object of the invention to provide a coffee storage container which provides a convenient way to press the piston downward within the jar. Accordingly, a stem is provided which selectively connects the lid and piston so that the user can use the lid to push the piston downward.

It is a still further object of the invention to provide a coffee storage container which allows the lid to rest directly upon the upper rim of the jar—regardless of the volume of coffee contained within the storage space and regardless of the vertical position of the piston. Accordingly, the stem may be disconnected from the piston and stored to allow the lid to rest flush upon the upper rim of the jar.

The invention is a coffee storage container, for storing a quantity of coffee within a jar having a bottom and a side wall, and using a piston having a top and bottom, and a one-way valve. The quantity of coffee is placed in the jar bottom. The piston extends within the jar and defines a storage volume beneath the piston bottom. A stem is selectively attached to the piston top to push the piston downward to allow air to escape through the one-way valve so that the storage volume becomes substantially the coffee volume and little or no air remains within the storage volume. The stem may be removed from the piston for storage.

To the accomplishment of the above and related objects the invention may be embodied in the form illustrated in the accompanying drawings. Attention is called to the fact, however, that the drawings are illustrative only. Variations are contemplated as being part of the invention, limited only by the scope of the claims.

BRIEF DESCRIPTION OF THE DRAWINGS

In the drawings, like elements are depicted by like reference numerals. The drawings are briefly described as follows.

DETAILED DESCRIPTION OF THE PREFERRED EMBODIMENTS

Figure 1:
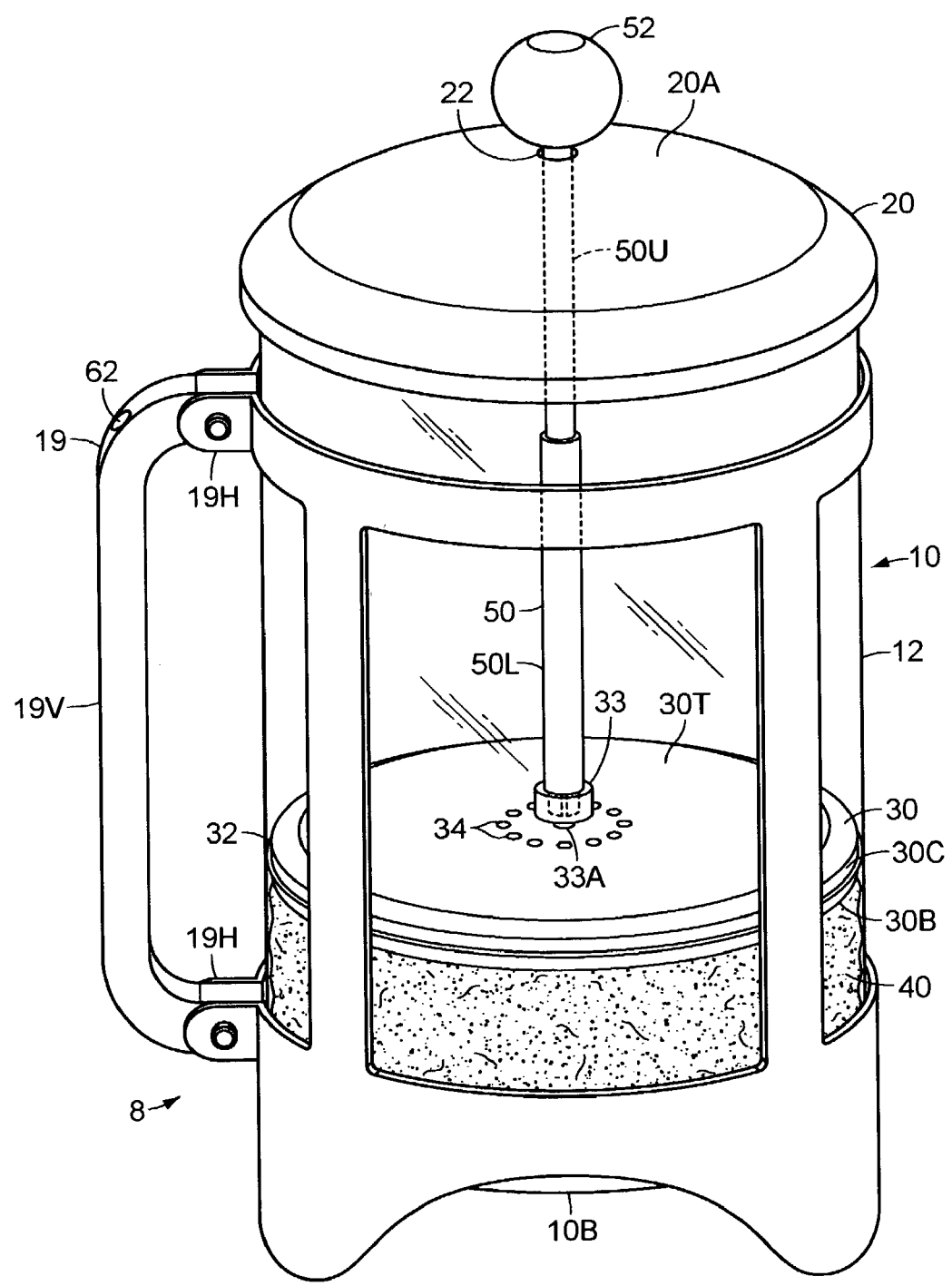
FIG. 1 is a diagrammatic perspective view, illustrating a coffee storage container according to the present invention, wherein the piston defines a storage volume therebeneath where a small volume of coffee is present but is accompanied by little or no air. The stem is extending from the lid to the piston.
Figure 2:
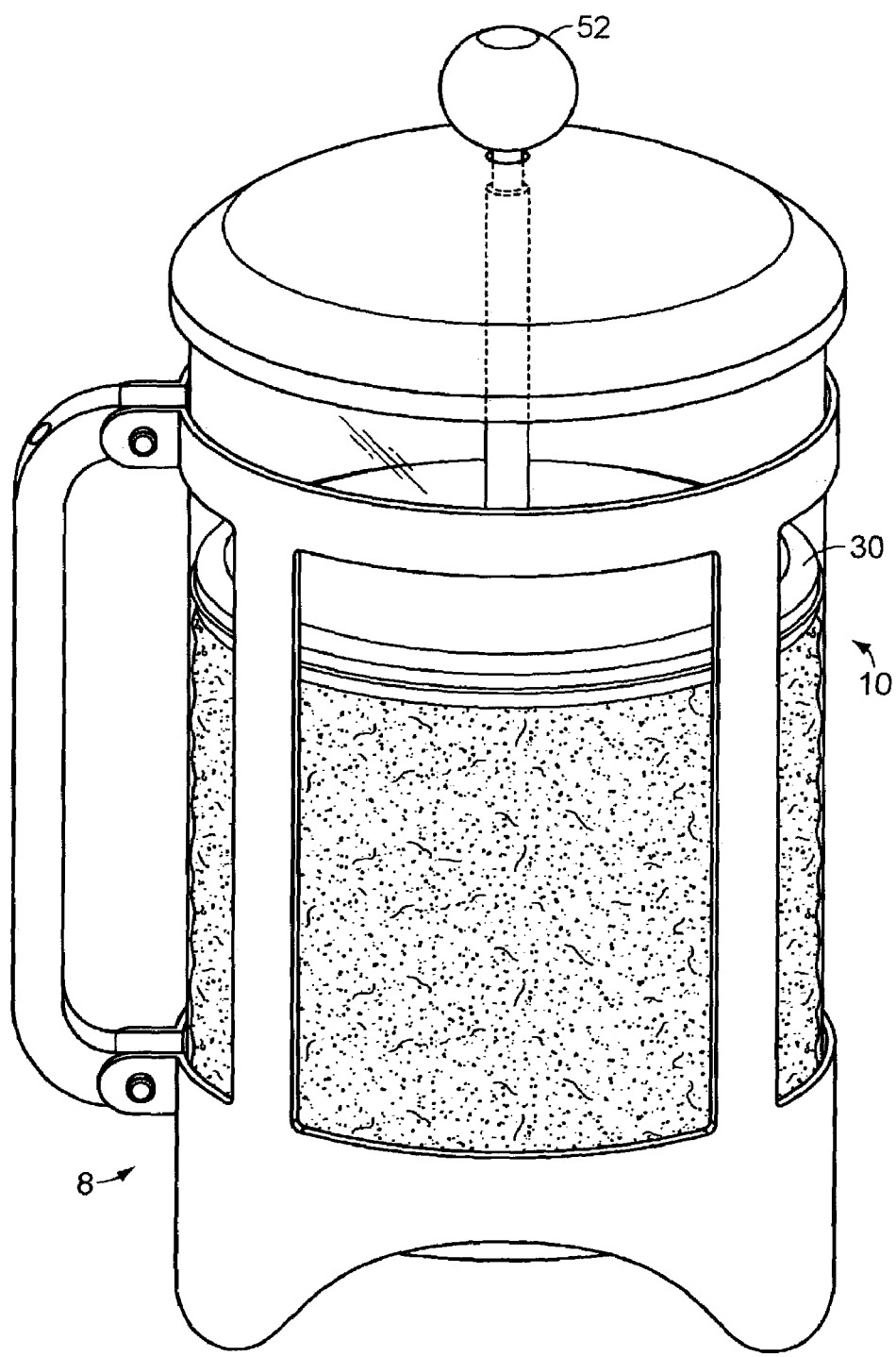
FIG. 2 is a diagrammatic perspective view, similar to FIG. 1, except wherein a more substantial volume of coffee is stored beneath the piston which is at a higher position within the jar, the stem however has been shortened to accommodate the higher position of the piston.
Figure 3:
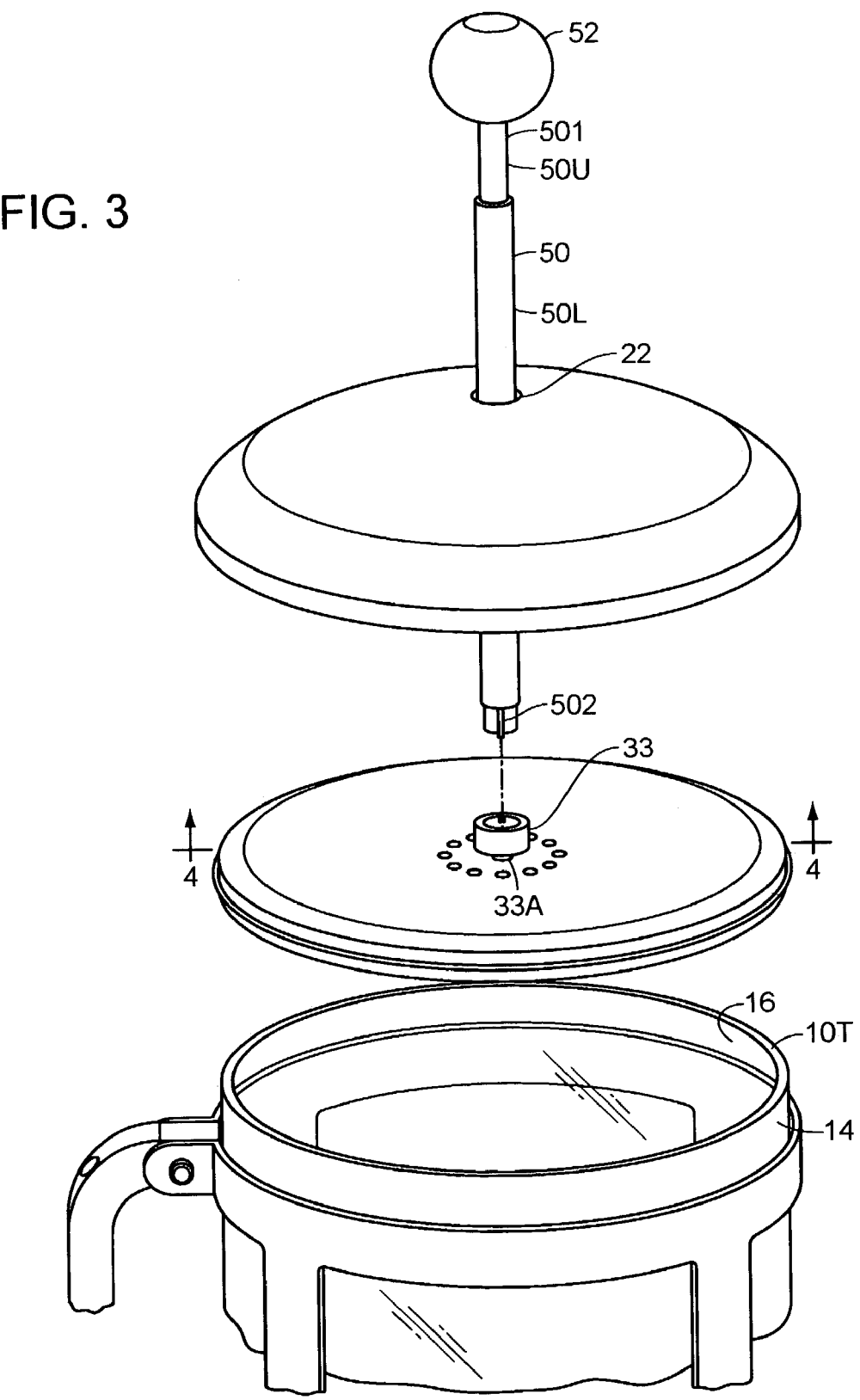
FIG. 3 is an exploded view, illustrating the piston removed from the jar, and the selective attachment of the stem to the top of the piston.

FIG. 1 illustrates a coffee storage container 8, having a jar 10 having a bottom 10B and a top rim 10T (seen in FIG. 3). The jar 10 has a substantially cylindrical side wall 12 extending between the bottom 10B and top rim 10T, and defining an interior volume therebetween. Referring momentarily to FIG. 3, the side wall 12 has a side wall exterior 14 and a side wall interior 16.

A lid 20 is sized to fit upon the jar 10, is generally domed, having an apex 20A, and having an aperture 22 at the apex 20A extending fully through the lid 20. The lid selectively rests upon the top rim 10T of the jar 10. A handle assembly 19 partially encases the jar 10 and allows the jar to be lifted therewith.

A piston 30 is sized to fit closely within the jar 10, spanning fully between the side wall interior 16 of the side wall 12. The piston 30 has a top 30T, a bottom 30B, and a circumference 30C. A sealing ring 32 extends fully around the circumference 30C and creates an air-tight seal between the circumference 30C and the side wall 12.

Located immediately beneath the piston 30 defines an area known as a storage volume. When the jar 10 is in use, a quantity of coffee 40, having a coffee volume fills the storage volume. As illustrated, in accordance with the present invention, the coffee volume is substantially equal to the storage volume, such that there is substantially no air within the storage volume. In order to eliminate the air from the storage volume, the piston is pressed downward closely against the coffee volume, and any air within the storage volume is allowed to escape upwardly through the piston 30.

Figure 4:
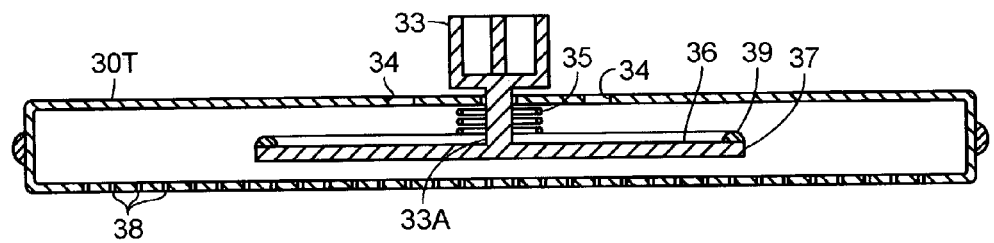
FIG. 4 is a side elevational view, illustrating the piston, and an exemplative one-way valve therefore.

In particular, referring to FIG. 4, an embodiment of the piston 30 is illustrated. The piston has a one-way valve, which may include a plurality of vents 34 in the piston top 30T, and a sealing plate 36 which selectively allows air to vent from within the piston 30 or selectively seals the vents 34 under the bias of a sealing spring 35. In particular, the sealing plate 36 has a periphery 37 having a sealing plate ring 39 which selectively seals upward against the piston top 30T under the bias of the sealing spring 35. The piston 30 has a hollow interior, and the bottom 30B has a multitude of pores 38 which allow air to enter the hollow interior of the piston. When the piston is pressed downward, air can enter the piston 30 through the pores 38. When the sealing plate 36 is pressed downward, air is allowed to escape from the hollow interior through the vents 34.

Accordingly, to effectively remove air from the storage volume, a stem 50 may be employed to both press the piston downwardly toward the jar bottom and to push the sealing plate 36 downward to allow air to escape through the vents. The stem 50 is preferably telescoping, having an upper stem 50U and a lower stem 50L to compensate for different coffee volumes and thus different heights of the piston within the jar 10. The stem 50 preferably has a twist and lock feature such that it can adjust in length, and fix its length with an appropriate twist. Numerous mechanisms are available to accomplish this result, as is well known by those skilled in the art. Accordingly, a detailed description of such a selectively telescoping and selectively lockable mast is beyond the scope of the present discussion.

The piston 30 has a stem seat 33 on the piston top 30T for accommodating the stem 50. In particular, the stem seat 33 is attached to the sealing plate 36 by a stem seat shaft 33A, such that downward pressure upon the stem seat 33 both opens the vents 34 and presses the piston 30 downward. The stem 50 has a first end 501 on the upper stem 50U and a second end 502 on the lower stem 50L. In particular, the second end 502 selectively mates with the stem seat 33, and the first end 501 extends upward through the aperture 22 in the lid 20. A finial 52 is mounted to the first end 501.

Accordingly, when the stem 50 extends downward through the aperture 22 in the lid 20 and is mated with the stem seat 33, downward pressure upon the finial 52 is translated into downward pressure upon the lid 20 and downward pressure upon both the piston 30 and the sealing plate 36. When it is desired to seal the coffee within the container, the lid 20, stem 50, and piston 30 arrangement is introduced to the jar 10, whereas the piston 30 is inserted downwardly into the jar 10 such that it spans within the interior walls of the jar. The lid 20 and stem 50 are used to press the piston 30 downwardly, venting air from the storage volume, until the storage volume and coffee volume are substantially the same, and substantially all air has been removed from the storage volume. Release of the stem 50, seals one way valve by allowing the sealing plate 36 to seat against the piston top 30T and prevents the introduction of air into the storage volume.

Figure 5:
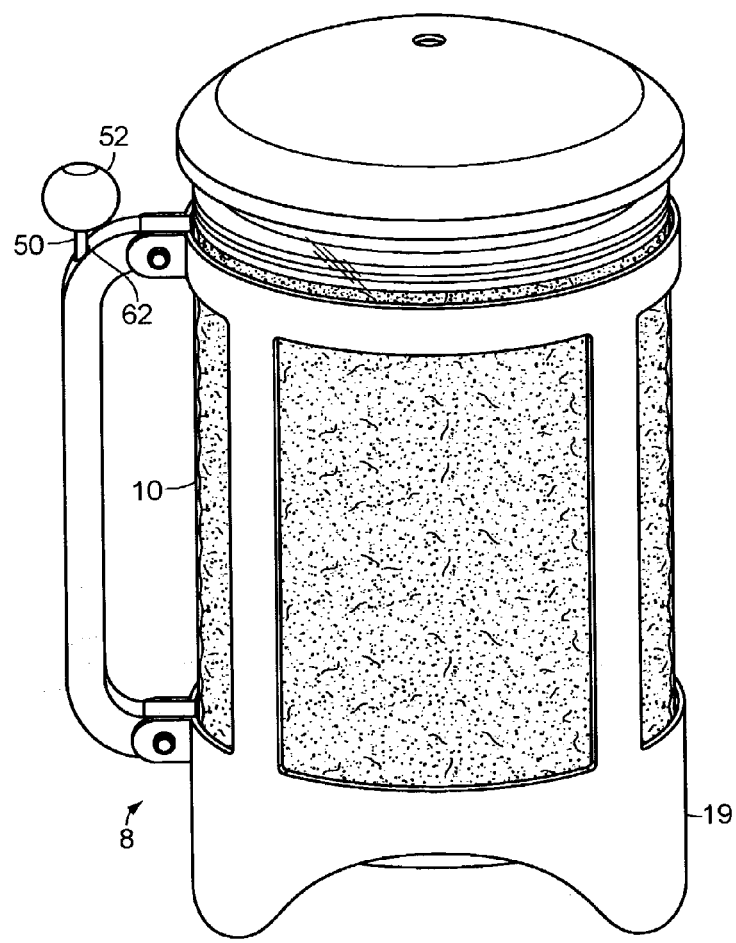
FIG. 5 is a diagrammatic perspective view, illustrating the invention, wherein the stem has been removed, and is being stored alongside the jar in a stem holder.

As previously noted, the telescoping nature of the stem 50 is helpful to allow the stem 50 to be used to press the piston downward—regardless of the present quantity of coffee contained within the jar 10, while allowing the finial to sit neatly atop the lid 20. However, when the jar is nearly full, or completely full, as shown in FIG. 5, the stem 50 cannot telescope to be short enough to remain within the jar with the finial still resting upon the lid. Accordingly, a stem storage cavity is provided in the handle 19 to facilitate storage of the stem 50. The stem storage cavity has a stem storage opening 62 which is sized to allow the stem 50 to extend into the stem storage cavity. Thus, once the stem second end 502 is removed from the stem seat 33, the stem second end 502 is extended downwardly through the stem storage opening 62 of the stem storage cavity, until the stem 50 is supported by the finial 52 resting upon the handle 19 adjacent the stem storage opening 62, whereby the stem 50 remains alongside the jar 10 until needed again to press the piston downward.

Referring momentarily to FIG. 1, the handle 19 has a pair of horizontal portions 19H, and a vertical portion 19V therebetween. The vertical portion 19V extends substantially parallel to the side wall 12 between the horizontal portions 19H. The horizontal portions 19H extend laterally outward from the side wall 12 and space the vertical portion 19V therefrom to allow a user to extend his/her hand between the vertical portion 19V and the side wall 12. In particular one of the horizontal portions 19H extend from the side wall near the top rim 10T, and the other horizontal portion extends from the side wall near the bottom 10B—providing sufficient space to allow said hand to be inserted between the handle 19 and the side wall 12. The vertical portion 19V is substantially hollow, so as to allow the stem 50 to be inserted fully therein, wherein it extends substantially vertically, as illustrated in FIG. 6. The stem storage opening 62 is located at an outwardly rounded junction between the horizontal portion 19H and vertical portion 19H, so that the stem storage opening 62 is positioned directly over the vertical portion 19V to take greatest advantage of the hollow interior of said vertical portion 19V so as to allow the stem 50 to be inserted fully therein for storage, and then removed therefrom prior to engaging the stem 50 with the piston 30.

During typical usage of the container, when coffee is to be retrieved from the jar, the lid 20 and piston 30 are removed, and the desired quantity of coffee is removed. Then the piston is replaced and the air is vented as previously described.

In conclusion, herein is presented a coffee storage container which effectively allows coffee to be stored in the near absence of air by effectively reducing the storage volume of the jar to that of the coffee itself. The invention is illustrated by example in the foregoing description and in the accompanying drawing figures. Numerous variations are possible, while adhering to the inventive concept. Such variations are contemplated as being a part of the present invention.

What is claimed is:

1. A coffee storage method, for storing coffee within a jar having a bottom, a top rim, and a cylindrical side wall extending between the bottom and top rim which define an interior volume within the jar, using a piston having a top and bottom and which fits closely within the side wall and has a one way valve which allows air to escape from beneath the piston to above the piston, wherein the jar has a lid which is sized to rest upon the top rim of the jar, and a stem which is selectively attachable to the piston top, comprising the steps of:

placing a volume of coffee within the jar;

defining a storage volume within the jar interior volume beneath the piston by extending the piston within the container spanning between the side wall;

decreasing the storage volume until it is substantially equal to the coffee volume by allowing air to escape from the storage volume through the piston by mating the stem with the piston top and pressing the piston downward toward the jar bottom by pressing the stem downward.

2. The coffee storage method as recited in claim 1, wherein the step of decreasing the storage volume until it is substantially equal to the coffee volume is followed by the steps of detaching the stem from the piston and covering the jar with the lid by placing the jar upon the top rim of the jar.

3. The coffee storage method as recited in claim 2, wherein the steps as recited are repeated until the coffee within the jar is depleted and between such repetitions the method further comprises the steps of:

removing the lid from the jar;

removing the piston from the jar; and removing a desired quantity of coffee from the jar.

4. The coffee storage method as recited in claim 3, wherein the jar has a handle extending laterally from the side wall, the handle having a vertical portion having a stem storage cavity having a stem storage cavity opening; and wherein the step of mating the stem with the piston is preceded by the steps of storing the stem within the stem storage cavity by inserting the stem into the stem storage opening in the handle, and removing the stem from the stem storage cavity.

\* \* \* \* \*